United States Patent
Feldmeier

(10) Patent No.: US 8,585,333 B2
(45) Date of Patent: Nov. 19, 2013

(54) SPINDLE COMPRISING A TENSION ROD AND A COUPLING DEVICE

(75) Inventor: Fritz Feldmeier, Nürnberg (DE)

(73) Assignee: Paul Mueller GmbH & Co. KG Unternehmensbeteiligungen, Nürnberg (DE)

( * ) Notice: Subject to any disclaimer, the term of this patent is extended or adjusted under 35 U.S.C. 154(b) by 1067 days.

(21) Appl. No.: 11/921,919

(22) PCT Filed: Jun. 14, 2006

(86) PCT No.: PCT/DE2006/000105
§ 371 (c)(1),
(2), (4) Date: Jul. 17, 2009

(87) PCT Pub. No.: WO2006/136136
PCT Pub. Date: Dec. 28, 2006

(65) Prior Publication Data
US 2010/0032910 A1 Feb. 11, 2010

(30) Foreign Application Priority Data

Jun. 21, 2005 (EP) .................................. 05013312

(51) Int. Cl.
B23C 5/26 (2006.01)
(52) U.S. Cl.
USPC ...................................... 409/233; 408/239 R
(58) Field of Classification Search
USPC .................. 409/233, 232; 408/239 R, 239 A
See application file for complete search history.

(56) References Cited

U.S. PATENT DOCUMENTS

| 1,955,879 A | 4/1934 | Griswold |
| 3,078,974 A | 2/1963 | Mann |

(Continued)

FOREIGN PATENT DOCUMENTS

| EP | 0 465 080 | 1/1992 |
| EP | 1 582 758 | 10/2005 |

(Continued)

OTHER PUBLICATIONS

Certified priority document application No. EP 05013312.3, filed Jun. 21, 2005.*

(Continued)

*Primary Examiner* — Erica E Cadugan
(74) *Attorney, Agent, or Firm* — Collard & Roe, P.C.

(57) ABSTRACT

The invention relates to a spindle, in particular a machine spindle, which is used to machine a work piece by means of a tool which is applied to the spindle, comprising an axially displaceable tension rod (30) which is used to secure the tool to the spindle, and a drive shaft (4) which is driven, in particular, by the motor of the spindle. The drive shaft of the spindle can be connected via a coupling device either to the tension rod (30) for axially displacing the tension rod (30) in order to change tools or to the tool in order to machine the work piece. The tension rod (30) can be axially displaced in a work shaft (1) which is embodied as a hollow shaft. The work shaft (1) can be arrested in relation to the housing (2) of the spindle in a first coupling position in order to axially displace the tension rod (30) within the work shaft (1) by the drive shaft (4). The angle position of the work shaft (1) and the drive shaft (4) can be freely selected in the first coupling position. A common drive of the work shaft (1) and the tension rod (30) can be produced by the drive shaft (4) in a second coupling position. The angle position of the work shaft (1) and the drive shaft (4) can be freely selected in the second coupling position.

5 Claims, 2 Drawing Sheets

(56) References Cited

U.S. PATENT DOCUMENTS

Figure 1:
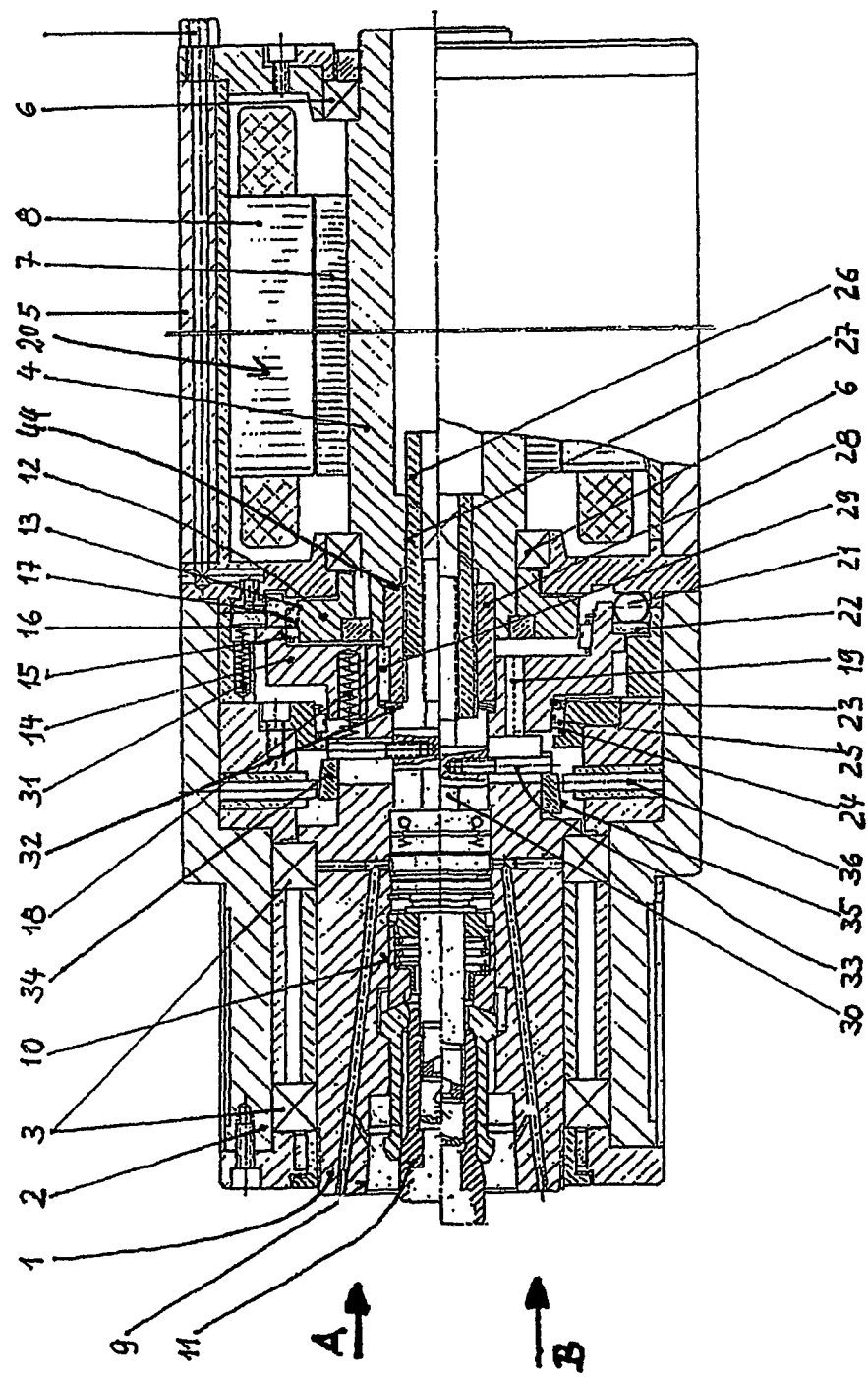

| | | | |
|---|---|---|---|
| 3,119,479 | A | 1/1964 | Lund |
| 3,426,874 | A | 2/1969 | Johnston, Jr. |
| 4,175,898 | A | 11/1979 | Wood |
| 4,413,938 | A * | 11/1983 | Kuczenski .................... 409/233 |
| 4,583,894 | A | 4/1986 | Mitchell |
| 4,677,719 | A * | 7/1987 | Link ................................. 29/40 |
| 5,109,964 | A | 5/1992 | Fukui et al. |
| 6,234,731 | B1 | 5/2001 | Sakamoto |
| 7,287,940 | B2 * | 10/2007 | Feldmeier et al. ............ 409/233 |
| 2004/0051256 | A1 | 3/2004 | Ayrton |
| 2007/0205068 | A1 | 9/2007 | Feldmeier |

FOREIGN PATENT DOCUMENTS

| | | |
|---|---|---|
| FR | 2 543 866 | 10/1984 |
| GB | 692 281 | 6/1953 |
| JP | 06-017851 | 1/1994 |
| WO | WO-03/049898 A1 * | 6/2003 |

OTHER PUBLICATIONS

International Search Report.
HSK-A DIN 69893-1 Form A.
DIN 69893-1 Details, 16, 16.160, 16.180, 16.210, 16.215, 16.296, 16.300, 16.305, 16.315, 16.453, 16.455, 16.470.

* cited by examiner

SPINDLE COMPRISING A TENSION ROD AND A COUPLING DEVICE

CROSS REFERENCE TO RELATED APPLICATIONS

This application is the National Stage of PCT/DE2006/001025 filed on Jun. 14, 2006 which claims priority under 35 U.S.C. §119 of European Application No. 05013312.3 filed on Jun. 21, 2005. The international application under PCT article 21(2) was not published in English.

The invention relates to a spindle, especially a machine spindle.

The Invention focuses on the task of offering a spindle the clamping rod of which for example can be slided for purpose of tool change without a separate drive.

This task is solved through the characteristic of a spindle, especially a machine spindle, for machining a work piece through a tool arranged on the spindle, with a slidable clamping rod for fastening the tool to the spindle and a drive shaft especially driven through the motor of the spindle, whereby the drive shaft of the spindle can be jointed through a coupling device either with the clamping rod for axial sliding of the clamping rod for the purpose of tool change or with the tool for machining the work piece.

Advantageous Design Forms of the Spindle are described in other embodiments of the present invention.

The clamping rod of the invention-based spindle is mounted in a working shaft of the spindle designed as hollow shaft, such that it can be axially moved. The working shaft can be jointed in a first coupling position with a freely selectable angle position with the working shaft, in order to carry out an axial slide of the clamping rod within the working shaft, for instance, for change of tool.

In a second coupling position, the drive shaft, jointly with working shaft and the clamping rod, can be jointed for rotation of the tool mounted in the clamping rod, especially for work piece machining. Even in this case, the angle position of the working shaft to the drive shaft can be freely selected. The invention-based spindle in totality therefore is especially capable of being variably used, and can be connected and disconnected in optional angular positions of the drive shaft to the working shaft as the first and as the second coupling position.

According to an advantageous design form, the coupling device has coupling elements in axial direction, which are slidable to each other, that is they can be moved axially to each other within a restricted path. This path restriction can be obtained through areas with outer and inner cones, which can be slided in one another within a restricted path. Hereby, what is achieved is that the coupling device both in the first as well as in the second coupling position reaches an automatic end position. An additional limitation of the axial slide path of the coupling element is no longer necessary.

A concrete design of the coupling can for instance be taken from the European Patent Application EP 04 007 914.7, application date 1 Apr. 2004, which was published as EP 1582758 A1. The content of the above mentioned European Patent Application is wholly incorporated by reference in the content of the above patent application, so that all design forms of the coupling device described therein can be realized even under the above invention-based spindle.

In a specially advantageous design form, the coupling device has a first coupling element with an inner cone, a second coupling element with an outer and an inner cone and a third coupling element with an outer cone.

Even under non-engagement of the third coupling element together with the outer cone with the second coupling element, under rotation of the drive shaft, no undesirable forces act on the inner-lying clamping body of the stationery second coupling element, despite the centrifugal force occurring The invention is explained on the basis of a design example in the figures:

The figures show:

FIG. 1A Sectional illustration of the invention-based spindle

Figure 2:
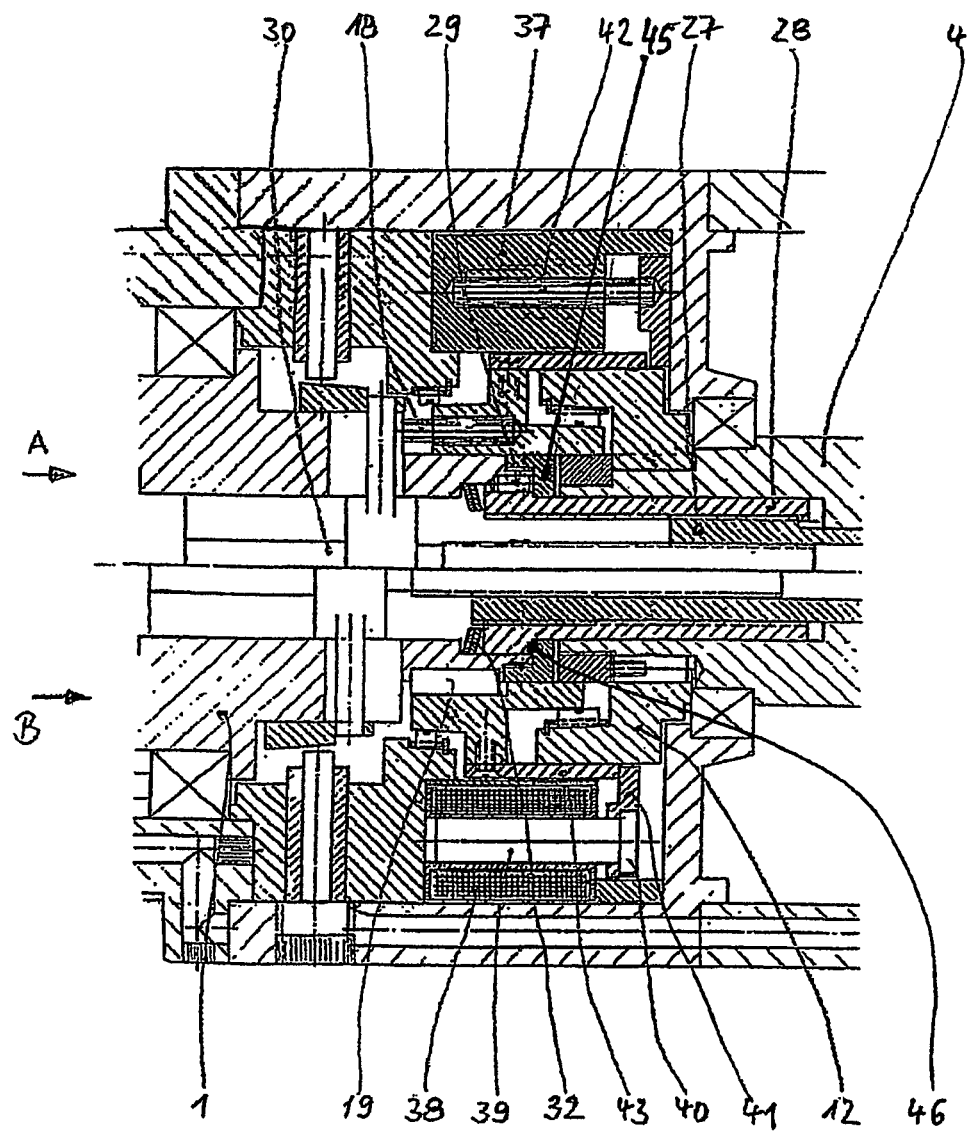

FIG. 2 An enlarged section from FIG. 1 with a modified design form of the coupling device In machines with drive-mechanisms or machine modules, in which several functions must be executed, it is hitherto customary to provide for each of these functions a drive of its own. It is normal that the rotation of an electro-hydraulic or pneumatic motor is generated and they carry out in general axial and radial movements during tasks such as tool-changing, work-piece clamping, work-piece changing, or tool-sliding, for instance through a cylinder or pneumatic drive.

The invention-based spindle has one single main-drive which is fastened either directly on the drive shaft or alternatively the drive is diverted by means of a belt drive or a gear system in the drive shaft.

The invention is illustrated in a spindle which brings a tool or work-piece in rotation and simultaneously carries out a periodic clamping, changing or sliding movement.

In the invention-based spindle, the spindle shaft is divided and arranged co-axially one after the other, whereby the separation gap between two shaft sections is just only so large that no contact occurs.

One shaft segment, the so called working shaft 1, has devices for holding (clamping) and moving of a tool or work piece and other piston segments. The other shaft segment, the so-called drive shaft 4 is either part of the drive motor or carries the drive element, such as the belt, toothed wheel or any other similar element. Both shaft segments can be separated or jointed with one another with the use of a coupling, whereby the coupling and the entire system is so designed that under separated shaft segments the drive motor generates a second function in the working shaft 1 that means a linear slide and clamping movement.

The coupling can be automatically switched, and can be assembled in the suggested design with less height so that the invention-based spindle system can be compactly designed, which is otherwise possible only under spindle systems with external activation of the clamping system.

Spindles in which all functions are integrated have generally a second, for example, a hydraulic or pneumatic drive system on the opposite end of the spindles to the clamping position for tool or work piece, for the purpose of clamping and sliding the clamping cone 9, which with its supply lines can be quite prominent.

Because of the doing away with the second drive device, under the invention-based drive, substantial savings in weight can be achieved, which is advantageous in fast movements and accelerations. Also the supply and control devices for the second drive system can be saved.

FIG. 1 shows a machine tool spindle for milling and grinding with automatic tool changing system Between working shaft and the divided drive shaft 4, a coupling is proposed with a winding system for generation of linear axial movements, and the chuck 11 and a monitoring system for the clamping and sliding movement. The coupling with actuation has a short switching path, can in any turning position grip very efficiently and is capable of being activated with relatively lesser force, in order to transmit from the drive shaft 4 to the working shaft 1.

The winding system in the jointing position of the two shaft segments can generate an additional transmission of force from torque of the drive motor to tensile force in the clamping rod, depending upon the design of the progression in the differential windings.

In FIG. 1, the condition/state "clamping tool closed or clamped" upper half of the central line is identified with A) and the condition/stage "clamping tool open" with B below the central line).

The spindle consists of a spindle-head with the working shaft 1, and chuck 11 mounted in clamping cone 9, whereby the working shaft 1 is pivot-mounted in housing 2 with the use of bearings 3. The drive shaft 4 is pivot-mounted in housing 5 with the use of bearing 6 independent of the drive shaft 1. The drive in FIG. 1 is for example an electro-motor 20 consisting of rotor 7, which is fastened to the drive shaft 4 and stator 8 mounted in housing 5. The drive can also be an air- or hydraulic motor or a belt-drive or a gear with external drive motor.

The working shaft 1 has at the outer end a central opening consisting of the clamping cone 9 and the cylindrical center bore 10, in which the chuck 11 is attached. Alternative to the illustrated HSK-Chuck 11, also a chuck or a clamping system with clamping fingers or a multi-jaw chuck fastened to the spindle end can be used.

The spindle condition A shows the chuck drawn-in in the drive shaft 1 that is the position "tool clamped". Under spindle condition B, the chuck 11 is withdrawn from the clamping cone 9 and the chuck with the tool can be taken away from the clamping cone. The HSK chuck, DIN 69893-1, is not illustrated. In a slit-chuck, this can radially open up and the tool can be removed. In position B, the tool can be taken out and a different tool inserted.

The upper spindle cross section A shows the spindle system in operating condition that means "tool clamp" and working shaft 1 is jointed with drive shaft 4 in a torsion-free manner.

The joint of two shafts is obtained with the switchable coupling device. This consists of the coupling flange 12 (3rd coupling element) with the conical outer surface 13 (outer cone), which is jointed with the drive shaft 4 in a twist-proof and vibration-proof manner. The coupling ring 14 (2.sup.nd coupling element) has an inner cone 15 running parallel to conical outer surface 13, and between the two cone surfaces a crown of clamping bodies 16, which are held in a cage-shaped ring, and are pressed with the use of a surrounding ring 17 against the inner cone 15. (See application EP 04 007 914.7, which was published as EP 1582758).

In a coupling of the type described in EP 04 007 914.7, which was published as EP 1582758, the clamping bodies are arranged pair-wise acting against one another so that play-free clamping is obtained in both rotation directions.

If the coupling ring 14 is pushed towards the right, then the outer one 13, inner cone 15 and clamping body 16 come in contact (that is, second and third coupling element) and form a torsion-free joint.

Axial movement of the coupling ring 14 towards the right is brought about through the press springs 18, and maintained. The coupling ring 14 is connected with the working shaft 1 through an axially slidable, but with a twist-proof joint, for instance, a positive locking shaft-grain connection 19.

The situation during tool change is illustrated in spindle cross section B. First, the drive motor 20 is stopped and through the connection 35, the compressed air is fed into the piston system. The piston is here for instance a hose ring 21 made of very stretchable material, which is blown through compressed air and moves the pressure ring 22 and thereby the coupling ring 14 towards the left (against arrow direction A). The piston in form of the ring-shaped hose is only a possibility for a smaller design. A fluid or compressed air impinged piston/cylinder system of known design type or a linear or rotary system with magnet force can also be used.

Through the relative axial sliding of inner cone 15 to the outer cone 13, a radial gap develops, which brings the clamping body 16 out of contact with the outer cone 13. Thereby, the connection of drive shaft with working shaft 1 is interrupted.

The coupling ring 14 is pushed so far to the left till the outer cone 23 at the other end of the coupling ring 14 comes in contact with the inner cone 24, which is jointed with the housing 2, through the clamping body crown 25 (first coupling element).

Thus, a torsion-free contact between coupling 14 and therewith the working shaft 1 and housing 2 is obtained while the rotary-union of drive shaft 4 to working shaft 1 is interrupted.

If now the drive (for instance, working motor 20) is switched on, then the drive shaft 4 rotates itself relative to the stationary working shaft 1 and thus the thread shaft 26, which is jointed torsion-free in segment section 27 with the drive shaft 4 such that it can be axially moved through a hexagonal profile, can move in and out of the threaded bush 28 which on its side is jointed in an axially slidable manner with the working shaft 1 through the sliding wedge 29 in a torsion-free manner.

The threaded shaft 26 has in its left segment an outer and an inner thread with different progressions. The outer thread works in conjunction with the inner thread of the threaded bush 28 and the inner thread of the threaded shaft 26 is in engagement with the thread on the clamping rod 30. Through suitable selection of different progressions of the threading, the axial movement of the clamping rod 30 can be so specified that under adequate load bearing capacity of the thread the required transmission of force between the torque of the drive motor and the drawing-in force of the clamping rods is obtained.

This clamping system is a closed system with respect to the cores of the force—this means that from the working shaft 1, no force is at all active on the outer side, because the progressions of the thread are self-locking/self-retard. Through the clamping of the tool, neither the bearing 3 comes under stress nor is an outer supporting force necessary. The axial force of the clamping rod 30 is taken by the threaded bush 28 and transmitted through the press-springs 32 to the working shaft 1. The press-spring 32 are in this process pressed together under the pre-tension by a few fraction of millimeter. This is adequate to set the chuck or the tool through impact or vibration during the work cycle and thus to compensate for a loss of a clamping force.

During change of tool, that is in the spindle cross-section B according to FIG. 1, the press spring 32 presses the threaded bush 28 against the end-facing system 44 on the working shaft 4. Here also the axial force necessary for the withdrawal of the clamping rod 11 from the working shaft 1 supports itself.

The change of work-piece therefore happens in the following sequence:

The drive motor 20 stops, then activating the piston 22 up to coupling 23, 24 closes; switching on the electro-motor in the rotation direction so that the clamping rod 30 and chuck 11 are pushed out from the working shaft 1. Then the electro-motor is stopped and the tool in the chuck 11 is replaced. Then, starting the electro-motor with opposite rotation direction so that chuck 11 is drawn-in and the tool is clamped.

Then, the compressed air for the piston stroke is terminated. The coupling ring 14 together with spring force 18 is pushed till the coupling 23,24 opens itself and the coupling 13,15 closes.

Moreover, the piston ring 22 is further pushed from the springs 31 so that the rotating coupling ring 14 is no longer in contact with the stationery piston ring 22. The electro-motor is now started with work rotation direction and the work cycle begins.

The work piece changing cycle and/or the opening and clamping the chuck 11 is monitored. For this, the clamping rod movement is transferred through carrier bolts 33 on a control ring 34, which is guided on the working shaft 1 such that it can be axially slided. This control ring 34 is conical outside and is passed-over a sensor 36 and thus generates an analogous signal. This signal reflects the axial position of the chuck 11, and gives information whether the respective end-position of the chuck 11 has been reached; and stops the machine, if the tool clamping movement was not completed. This means that the tool is not currently clamped or—if the clamping rod moves beyond the end-point—that no tool is found in the clamping system. Similarly, it monitors the ejection procedure of the tool.

FIG. 2 shows a further possibility to activate the coupling. Electro-magnets, uniformly distributed on the circumference, are fastened in a carrier ring 37. The individual magnets consists of the magnets spool 38 and the axially movable magnet core 39, which is made of magnetizable steel. The magnet cores 39 with their collars 40 are hung at the open magnet ends in the switching ring 41, and are held in the utmost right bearing with the help of springs 42, which supports themselves in carrier ring 37.

Thereby, it is ensured that during the work-cycle of the spindle, no contact takes place between the stationery switching ring 41 and the switching sleeve 43, which is firmly jointed with the coupling ring 14.

For opening the clamp system, the magnet spool 38 is supplied with current and pulls the magnet core 39 in the magnet spool 38. Through the collar 40, which pulls along the switching ring 41, the coupling ring 14 is pulled from the switching sleeve 43 to its left end position, that means till the coupling 23,24 closes.

After switching off the current for magnet spools 38, the coupling ring 14 is brought again through the spring force 18 in the work position, and the spring force 42 takes care of separating the switching ring 41 and the switching sleeve 43. Instead of the individual electromagnets, small hydraulic cylinders or air cylinders can be proposed, whereby the free-ends of the piston rod has similarly a collar 40, so that the further function corresponds precisely to the procedure prescribed above, whereby the axial force in the clamping rod 30 supports for pushing out the chuck 11 in the working shaft 1. The threaded bush 28 is held through the ring nut 45 on the working shaft 1 against the press spring 32 in its axial position. The shoulder/offset of the threaded bush 28 presses the ring nut 45 at the position identified with 46. This design has the advantage that also during the change of tool, no force whatsoever acts towards the outer by the working shaft 1.

REFERENCE NUMBERS

1. Working Shaft
2. Housing
3. Bearing
4. Drive Shaft
5. Housing
6. Bearing
7. Rotor
8. Stator
9. Clamping Cone
10. Centering Bore
11. Chuck
12. Coupling Flange
13. Outer Surface
14. Coupling Ring
15. Inner Cone
16. Clamping Body
17. Spring
18. Compression/Pressure Spring
19. Shaft-Grain Connection
20. Drive Motor
21. Hose Ring
22. Pressuring Ring
23. Outer Cone
24. Inner Cone
25. Clamping Body Crown
26. Threaded Shaft
27. Segment/Section
28. Threaded Bush
29. Slide Wedge
30. Clamping Rod
31. Spring
32. Pressure Spring
33. Carrier Bolt
34. Control Ring
35. Compressed Air Connection
36. Sensor
37. Carrier Ring
38. Magnet Spool
39. Magnet Core
40. Collar
41. Jumper/Switching Ring
42. Spring
43. Switching Sleeve
44. End-facing Device
45. Ring Nut
46. Position/Stelle

The invention claimed is:

1. A machine spindle, for machining a work piece via a tool arranged on the machine spindle, said machine spindle comprising
   a housing;
   a drive shaft having a longitudinal axis, said drive shaft being rotated by a motor of the spindle around its longitudinal axis and being pivot-mounted in the housing;
   a hollow working shaft having a longitudinal axis, said hollow working shaft being pivot-mounted in the housing, wherein the longitudinal axis of the hollow working shaft and the longitudinal axis of the drive shaft are aligned coaxially to each other;
   a clamping rod for fastening the tool to the machine spindle, the clamping rod being mounted within the hollow working shaft such that the clamping rod is slideable in a direction axially to the longitudinal axis of the hollow working shaft;
   a coupling device for selectively coupling, in a first coupling position, the drive shaft with the clamping rod for the purpose of tool change, or coupling, in a second coupling position, the drive shaft with the tool for machining the work piece;
   wherein in the first coupling position, the hollow working shaft is connected with the housing so as to be non-rotatable relative to the housing, and is disconnected from the drive shaft such that the drive shaft is rotatable relative to the hollow working shaft, and the clamping rod is coupled with the drive shaft so that the clamping rod can be slided in the direction axially to the longitudinal axis of the hollow working shaft by the drive shaft;

wherein in the second coupling position, the hollow working shaft is connected with the drive shaft such that the hollow working shaft does not rotate relative to the drive shaft, and the hollow-working shaft is disconnected from the housing so that the working shaft and the drive shaft can rotate together relative to the housing; and wherein the connections and disconnections in the first coupling position and the second coupling position can be carried out in any rotation position of the drive shaft about the longitudinal axis of the drive shaft.

2. The machine spindle according to claim 1, wherein the coupling device comprises coupling elements which are aligned coaxially to the longitudinal axis of the drive shaft and which can be slided relative to each other in a direction axially to the longitudinal axis of the drive shaft, wherein the coupling elements can be slided along a restricted path.

3. The machine spindle according to claim 2, wherein one of the coupling elements is a first coupling element with an inner cone, wherein one of the coupling elements is a second coupling element with an outer and inner cone and wherein one of the coupling elements is a third coupling element with an outer cone.

4. The machine spindle according to claim 2, wherein the coupling elements can be slided relative to each other in two directions axially to the longitudinal axis of the drive shaft, whereby in both directions a path restriction of the axial sliding takes place.

5. The machine spindle according to claim 1, said machine spindle further comprising a threading device, said threading device comprising a threads, which so that, in the first coupling position of the coupling device, the clamping rod can be slided in the direction axially to the longitudinal axis of the hollow working shaft by the drive shaft via the threading device.

* * * * *

UNITED STATES PATENT AND TRADEMARK OFFICE
CERTIFICATE OF CORRECTION

PATENT NO. : 8,585,333 B2  Page 1 of 1
APPLICATION NO. : 11/921919
DATED : November 19, 2013
INVENTOR(S) : Fritz Feldmeier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1641 days.

Signed and Sealed this
Twenty-second Day of September, 2015

Michelle K. Lee
*Director of the United States Patent and Trademark Office*